(12) United States Patent
Scott et al.

(10) Patent No.: US 11,834,807 B2
(45) Date of Patent: Dec. 5, 2023

(54) GEOPHYSICAL SENSOR RETRIEVAL SYSTEM

(71) Applicant: Geophysical Technology, Inc., Bellaire, TX (US)

(72) Inventors: Gary Scott, Missouri City, TX (US); Sean Clancy, Houston, TX (US); Robert Hauser, Frisco, TX (US); Richard Degner, Bellaire, TX (US)

(73) Assignee: Geophysical Technology, Inc., Bellaire, TX (US)

( * ) Notice: Subject to any disclaimer, the term of this patent is extended or adjusted under 35 U.S.C. 154(b) by 106 days.

(21) Appl. No.: 17/175,153

(22) Filed: Feb. 12, 2021

(65) Prior Publication Data

US 2021/0254307 A1    Aug. 19, 2021

Related U.S. Application Data

(60) Provisional application No. 62/976,091, filed on Feb. 13, 2020.

(51) Int. Cl.
*E02F 9/20* (2006.01)
*G05D 1/00* (2006.01)
(Continued)

(52) U.S. Cl.
CPC ............... *E02F 9/205* (2013.01); *E02F 3/32* (2013.01); *E02F 9/2041* (2013.01);
(Continued)

(58) Field of Classification Search
CPC . E02F 9/205; E02F 3/32; E02F 9/2041; E02F 3/26; E02F 3/961; E02F 9/245;
(Continued)

(56) References Cited

U.S. PATENT DOCUMENTS

| 3,487,565 A | * | 1/1970 | Daniel | ............... | E02F 3/246 |
| | | | | | 37/189 |
| 4,600,356 A | * | 7/1986 | Bridges | ............... | E02F 9/245 |
| | | | | | 172/6 |

(Continued)

FOREIGN PATENT DOCUMENTS

CN        209268021 U   *  8/2019

OTHER PUBLICATIONS

English Machine Translation of CN209268021U, acquired Oct. 18, 2022.*

(Continued)

*Primary Examiner* — Jeff A Burke
*Assistant Examiner* — Blake A Wood
(74) *Attorney, Agent, or Firm* — Richard A. Fagin

(57) ABSTRACT

A sensor retrieval system includes a self-propelled unmanned ground vehicle (UGV) having a control system including a navigation controller, an excavator controller and an extractor controller. The navigation controller has instructions to move the UGV to proximate a geodetic position of a sensor disposed proximate a surface of the ground. The UGV further comprises a sensor position locator arranged to determine distance, direction and relative elevation of the sensor with respect to the UGV. An extractor is in signal communication with the extractor controller. The extractor comprises means for lifting the sensor from the ground to a predetermined depth. An excavator is in signal communication with the excavator controller. The excavator comprises means for removing overburden from above the sensor to leave the overburden to at most the predetermined depth. The navigation controller has instructions to position the UGV such that the extractor is disposed above the sensor when the relative elevation is at most the predetermined depth and to position the UGV such that the excavator is (Continued)

disposed above the sensor when the relative elevation is above the predetermined depth. The navigation controller, the extractor controller and the excavator controller have instructions to position the UGV, operate the extractor and operate the excavator to remove excess overburden and extract the sensor based on the relative elevation.

17 Claims, 13 Drawing Sheets

(51) Int. Cl.
  *G05D 1/02* (2020.01)
  *E02F 3/32* (2006.01)
(52) U.S. Cl.
  CPC ............ *G05D 1/0088* (2013.01); *G05D 1/028* (2013.01); *G05D 2201/0202* (2013.01)
(58) Field of Classification Search
  CPC .......... E02F 5/003; E02F 9/264; G05D 1/028; G05D 1/0088; G05D 2201/0202
  See application file for complete search history.

(56) References Cited

U.S. PATENT DOCUMENTS

2014/0121979 A1* 5/2014 Grimsbo ............... E21B 47/095
                                                    73/152.16
2018/0231675 A1* 8/2018 Degner .................. G01V 1/168

OTHER PUBLICATIONS

Herman Herman, Sanjiv Singh, First results in autonomous retrieval of buried objects, Automation in Construction, vol. 4, Issue 2, 1995, pp. 111-123.*
"Acoustic Signal" Definition acquired from IADCLexicon.org, acquired Oct. 18, 2022.*
International Search Report and Written Opinion dated Jun. 1, 2021, for International application No. PCT/US2021/17887.
Substantive Examination Report Notice dated Mar. 28, 2023 for Saudi Arabia Application No. 522440144; and English translation.

* cited by examiner

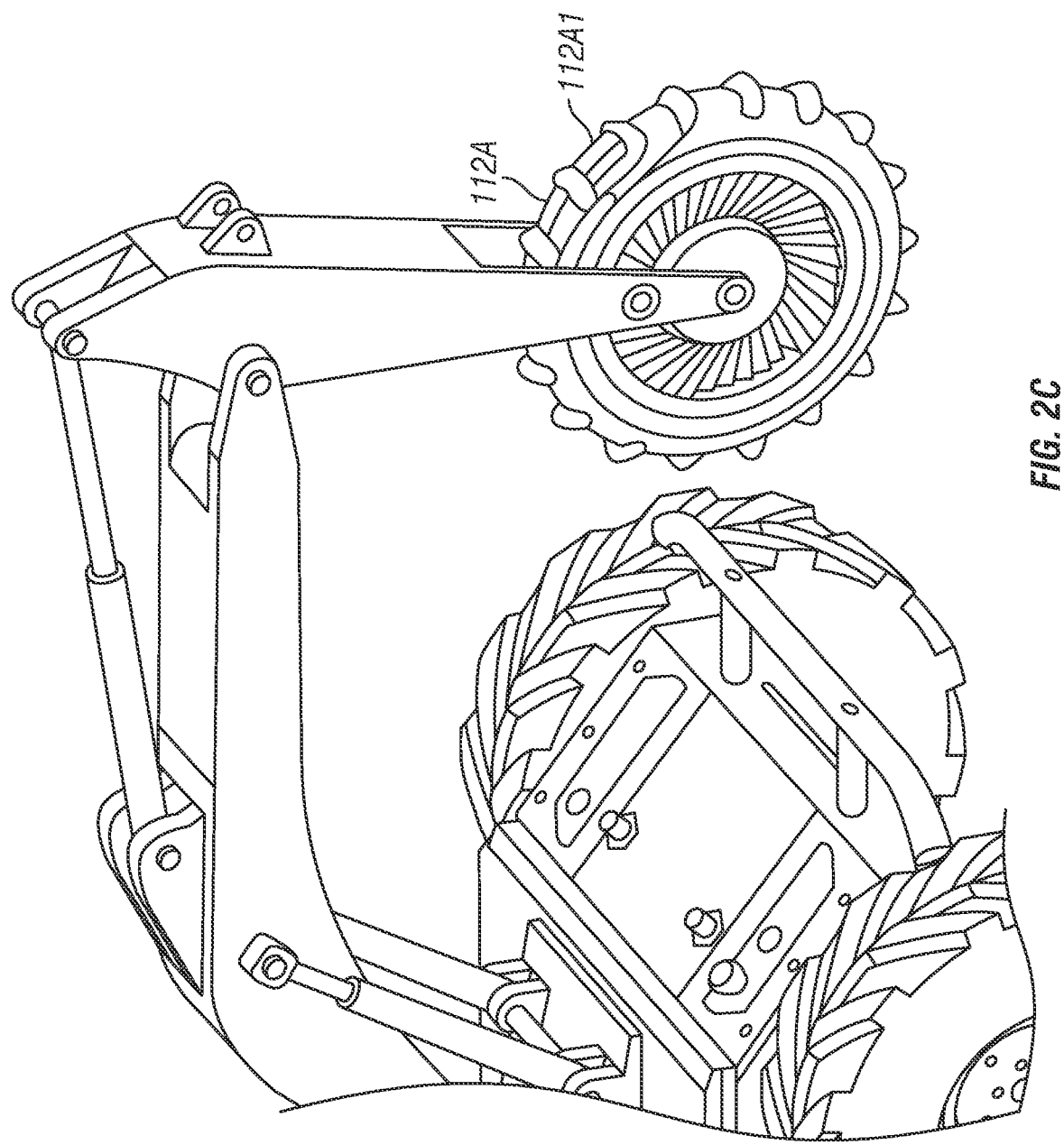

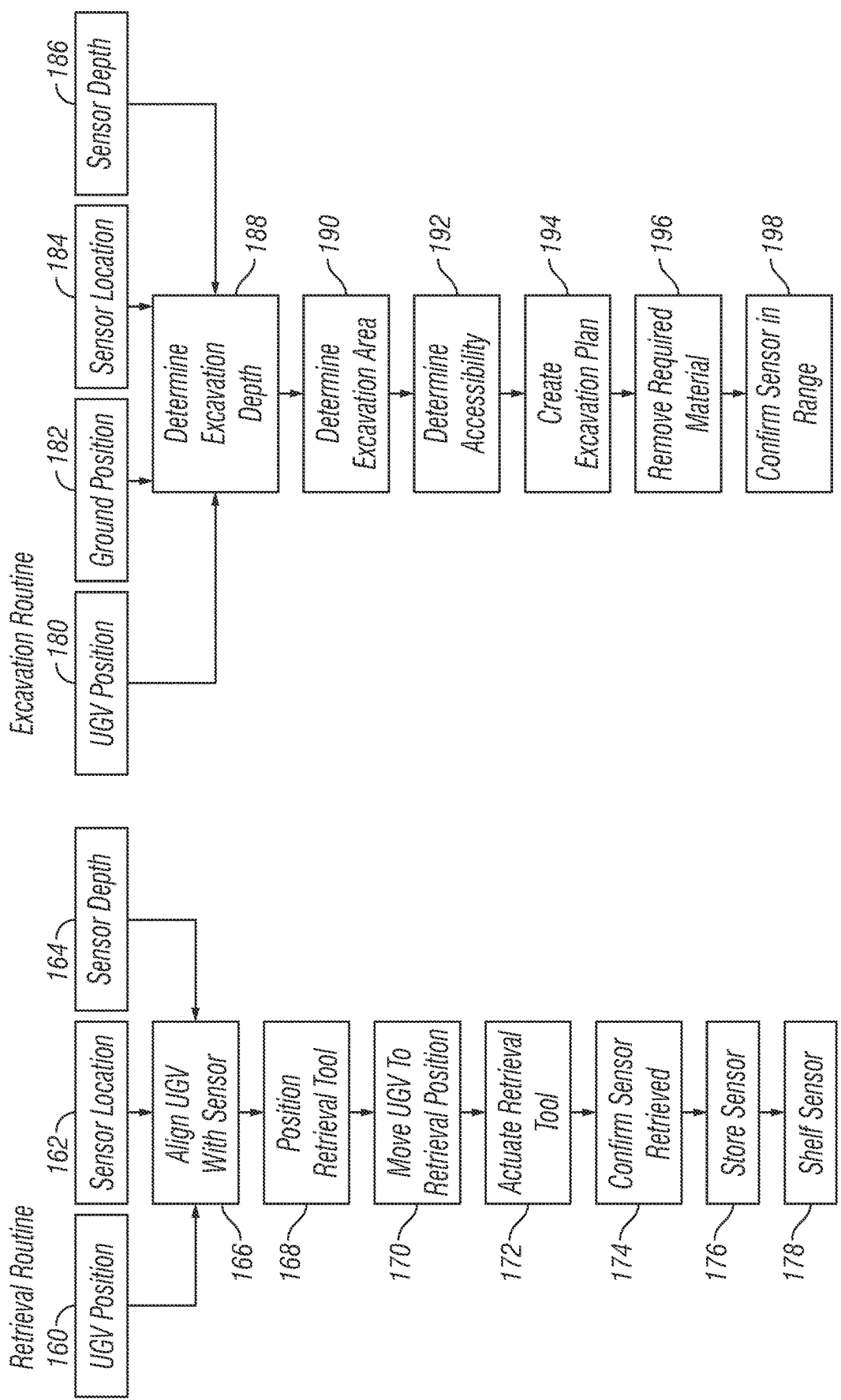

GEOPHYSICAL SENSOR RETRIEVAL SYSTEM

CROSS REFERENCE TO RELATED APPLICATIONS

Priority is claimed from U.S. Provisional Application No. 62/976,091 filed on Feb. 13, 2020 and incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of geophysical surveying. More particularly, the disclosure relates to apparatus for automatically retrieving deployed geophysical sensors.

U.S. Pat. No. 10,054,700 issued to Degner et al. discloses a nodal-type geophysical sensor with improved ground coupling. International Application Publication No. WO 2017/066738 discloses an apparatus for deploying ground contact sleeves and the sensors disclosed in the Degner et al. '700 patent. The foregoing deployment apparatus may be automated to improve economic efficiency. Such efficiency improvement may result from reducing the number of persons needed to locate intended geodetic locations for and to deploy the geophysical sensors at such locations.

While such sensors as disclosed in the Degner et al. '700 patent are inexpensive, and the associated ground contact sleeves may be considered to be expendable items, it is desirable to retrieve the sensors themselves for data interrogation and possible redeployment. While automated retrieval may be relatively straightforward, in some conditions, such as where the sensors have been deployed subject to blowing sand and silt, they may become partially or totally buried during the course of a geophysical survey. Accordingly, automated retrieval may be complicated in such conditions, thereby requiring a different apparatus for automated retrieval.

SUMMARY

One aspect of the present disclosure is a sensor retrieval system. The system includes a self-propelled unmanned ground vehicle (UGV) having a control system including a navigation controller, an excavator controller and an extractor controller. The navigation controller has instructions to move the UGV to proximate a geodetic position of a sensor disposed proximate a surface of the ground. The UGV further comprises a sensor position locator arranged to determine distance, direction and relative elevation of the sensor with respect to the UGV. An extractor is in signal communication with the extractor controller. The extractor comprises means for lifting the sensor from the ground to a predetermined depth. An excavator is in signal communication with the excavator controller. The excavator comprises means for removing overburden from above the sensor to leave the overburden to at most the predetermined depth. The navigation controller has instructions to position the UGV such that the extractor is disposed above the sensor when the relative elevation is at most the predetermined depth and to position the UGV such that the excavator is disposed above the sensor when the relative elevation is above the predetermined depth. The navigation controller, the extractor controller and the excavator controller have instructions to position the UGV, operate the extractor and operate the excavator to remove excess overburden and extract the sensor based on the relative elevation.

In some embodiments, the navigation controller, the excavator controller and the extractor controller comprise at least one of a microcontroller, a microprocessor, a floating programmable gate array and an application specific integrated circuit, In some embodiments, the navigation controller, the excavator controller and the extractor controller form part of a system controller.

Some embodiments further comprise a geodetic position signal receiver in signal communication with the navigation controller.

Some embodiments further comprise a radio frequency signal receiver in signal communication with the navigation controller for detecting a radio frequency location signal emitted by the sensor.

In some embodiments, the navigation controller comprises a radio frequency transmitter arranged to emit a trigger signal detectable by the sensor to initiate transmission of the radio frequency location signal.

In some embodiments, the excavator comprises a wheel comprising excavating projections.

In some embodiments, the wheel and excavating projections comprise elastomer.

In some embodiments, the extractor comprises a tined fork.

In some embodiments, the extractor comprises a bucket having a screen or mesh therein for separating ground cover from the sensor.

Some embodiments further comprise a vibrator operable to vibrate the extractor so as to enhance separating the ground cover from the sensor.

Some embodiments further comprise a storage bin disposed on the UGV, wherein the extractor is operable to discharge extracted sensors into the storage bin.

A method for retrieving sensors disposed proximate a ground surface according to another aspect of this disclosure includes automatically moving a vehicle comprising an excavator and an extractor to a position proximate a sensor disposed proximate a ground surface. A depth of the sensor below the ground surface is determined. The extractor is automatically over the position when the sensor depth is at most equal to a predetermined depth or automatically positioning the extractor over the position if the sensor depth is greater than the predetermined depth. The excavator is operated to remove surface cover to reduce the sensor depth to at most the predetermined depth when the extractor is positioned over the position. The extractor is operated to remove the sensor when the sensor depth is at most equal to the predetermined depth The sensor is deposited in a storage bin on the vehicle. The vehicle is automatically moved to either a location of another sensor and the excavation and extraction are repeated for the another sensor, or the vehicle is automatically moved to a predetermined other location.

In some embodiments, the determining depth comprises detecting a radio frequency signal transmitted by the sensor.

In some embodiments, the automatically moving the vehicle to the position proximate the sensor comprises determining a geodetic position of the vehicle and comparing the geodetic position to a predetermined geodetic position of the sensor.

In some embodiments, the automatically moving the vehicle to the position proximate the sensor comprises detecting a radio frequency signal transmitted by the sensor.

Some embodiments further comprise interrogating a data storage device in the sensor by communicating between the sensor and a controller in the vehicle.

Other aspects and advantages will be apparent from the description and claims that follow.

BRIEF DESCRIPTION OF THE DRAWINGS

FIGS. 2B and 2C show the example embodiment of FIG. 2A with a different embodiment of an excavator.

FIG. 13 shows a flow chart of actions taken using the extractor automatically to retrieve sensors.

FIG. 14 is a flow chart of extra actions using the excavator.

DETAILED DESCRIPTION

Figure 1:
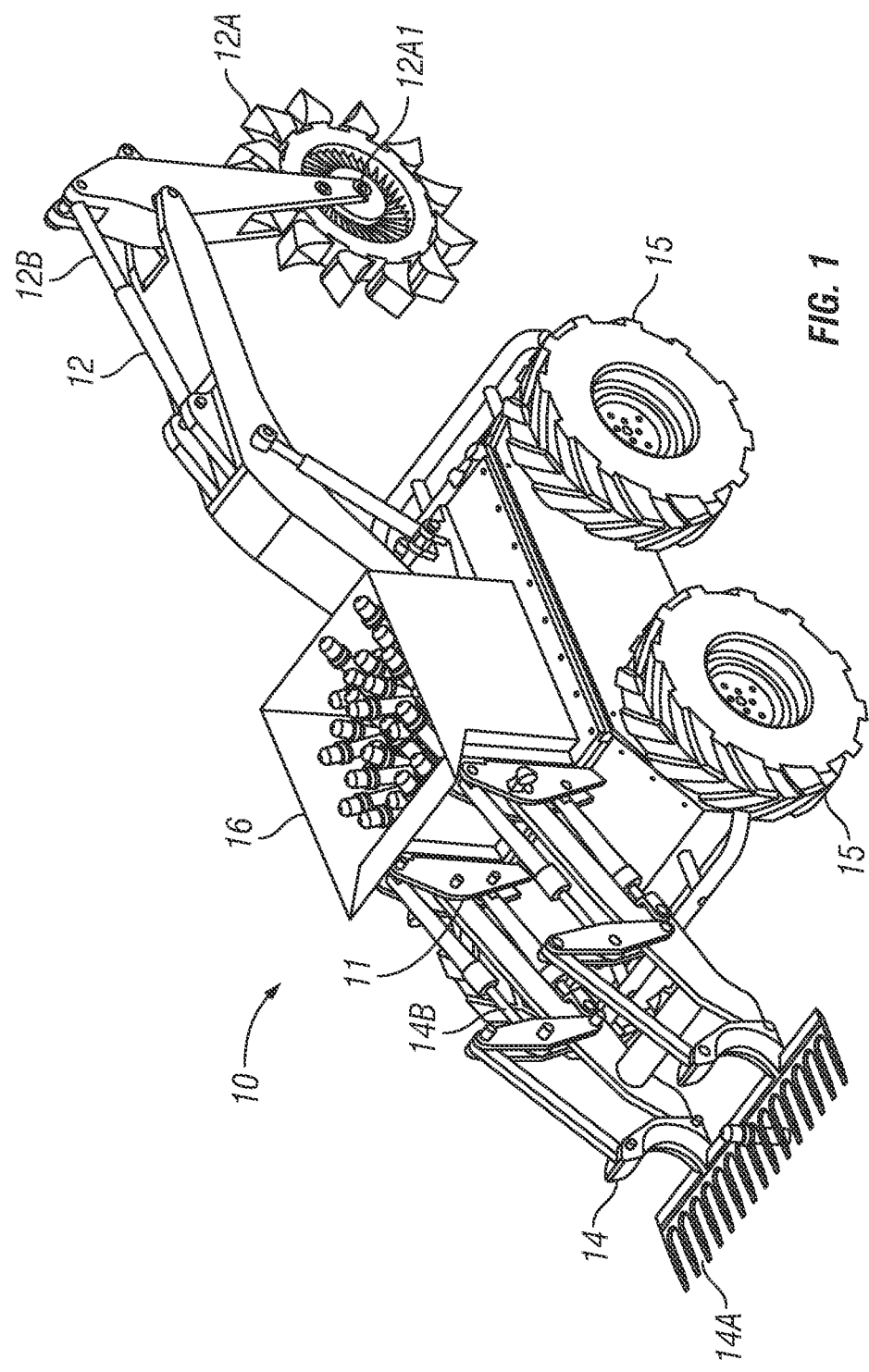
FIG. 1 shows an example embodiment of a sensor retrieval system according to the present disclosure.

In general terms, an apparatus according to the present disclosure can locate, excavate, extract, store, and transport geophysical sensors back to a central command station or other chosen location. Some embodiments of an apparatus according to this disclosure may comprise a centimeter accuracy radio location system, wherein once the apparatus is determined to be within a pre-set proximity of each deployed geophysical sensor, the apparatus may precisely locate the target sensor in space, even when covered with silt and sand. The apparatus uses a sensor extraction system to extract the sensors from the ground and separate them from any unconsolidated material that may adhere from the respective deployment position. Additionally, the apparatus may have an excavation system to remove ground material that is below, above and around a geophysical sensor to be recovered. Once each geophysical sensor is extracted, the apparatus has the capacity to internally store multiple retrieved sensors until they are transported to the chosen location. All subsystems of the apparatus may be assembled, for example, on an existing, commercially available unmanned ground vehicle (UGV).

The apparatus comprises a UGV, for example, a commercially available UGV, which may be designed to travel over rough and uneven ground, at times with inclines of at least 30 degrees. The UGV may have the ability to operate in terrains including frozen tundra, shallow water swamp and marsh conditions, and free blowing sand and silt environments. The UGV may use continuous optical scanning to navigate around surface obstacles and variations of the terrain. A built-in safety system may be used stop the UGV if any unexpected conditions or obstacles that pose risk to the apparatus are detected. The UGV may have the ability to travel guided by satellite navigation such as GPS or GNSS. The UGV may also comprise a sensor location system for close range navigation to a geophysical sensor when in range of the geophysical sensor's radio frequency (RF) communication signals. The UGV may provide video and apparatus functional condition ("health") and status updates using, for example, RF communication with an observation center or control panel having equipment that can continuously monitor the UGV operation. The UGV may have the ability to be controlled remotely by satellite and/or RF communication if and as necessary from such control panel or any other remote location having signal communication with the UGV. The UGV may be outfitted to manage several tasks related to recovery of previously deployed geophysical sensors.

The UGV may navigate to known geodetic locations, for example, using GPS or GNSS determined coordinates to predetermined geophysical sensor locations using an on board navigation system, e.g., geodetic location signal sensors (e.g., GPS or GNSS signal sensors). Upon arrival of the UGV to within a predetermined distance of each geophysical sensor location, the navigation system may interrogate a RF signal detection and location system, which may include one or more array antennas) to provide precise (e.g., centimeter accuracy) range, direction, and elevation angle (R, D, & A) information with reference to an RF communication device disposed in or with the respective sensor. In some embodiment, the RF signal detection and location system may be based on Bluetooth, LoRa, Wi-Fi, or any other known communication protocol. The R, D and A information along, with the UGV position and environmental surroundings data may be processed in a controller or other signal processor on board the UGV to determine the target geophysical sensor depth, whether the determined sensor depth is below the existing ground surface, and whether any environmental obstructions hinder the retrieval of that sensor. For typical retrieval of sensors on or just below the surface of the ground, the UGV will navigate into a position to use its extraction system to retrieve the sensor. If a sensor is detected to be deeper than the extraction system can operate to extract any individual sensor, an excavation system on the UGV may be used to remove some of the unconsolidated material covering the target sensor so that it may be retrieved with the extraction system after excavation. If the sensor is determined to be irretrievable due to excessive depth or other environmental limitations, a failed recovery routine may be initiated to recover any desired sensor information and record precise sensor position for future retrieval.

In some embodiments, the UGV may operate so as not to use predetermined sensor locations to navigate the UGV to sensor locations, but instead using reception of RF signals emitted by the sensors as the UGV travels through a dynamic or preprogramed search pattern. A controller in the UGV may make autonomous operating control decisions as needed for avoiding terrain obstructions/collisions/falls. RF information detected by equipment on the UGV as emitted by the sensors may comprise signals such as GNSS position coordinates, and RSSI, a particular RF locating signal that may be generated by the sensors. Such locating signals may be initiated by an RF "calling" or actuating signal from the UGV. The responding location signal from the sensor can be detected by a receiving antenna array on the UGV and analyzed by the controller, and may then be used by the UGV to navigate to the position of a sensor that was not previously known. Such embodiments may be used for ordinary recovery of sensors as well as finding and recovering lost sensors whose location is not previously known (e.g., sensors that have fallen from a transportation vehicle).

The UGV navigation to, and positioning at a sensor location may use one or more of multiple locating stages: preprogramed sensor locations, RF signals from the sensor containing the sensor's geodetic position information, RF RSSI, short range special RF signals that can be analyzed as explained above, a metal detector and excavation acoustic signal changes as reported by the sensor.

In certain cases, the above mechanisms for locating a sensor site may need an augmented locating mechanism, e.g., where the sensor has unreliable geodetic position information due to a short duration in the field or failure of the geodetic position signal system(s), where the sensor has a fault that prevents it from receiving geodetic position signals, where there is a range gap between the longest RF signal from the sensor and the range of the special RF signal that can be detected by the equipment on the UGV. In some embodiments, the UGV may use an augmented locating mechanism, wherein an acoustic transducer on the UGV generates an acoustic signal and analyzes the acoustic signal as received by an acoustic sensor on or in the geophysical sensor. Information about the detected acoustic signal may be returned to the UGV over an RF signal channel. The UGV may stop, create one or more known signal patterns to be transmitted through the transducer, analyze the signal as received by the sensor and adjust the UGV direction of travel in response. In some embodiments, the natural acoustic signature of the UGV as it travels may be used for such analysis and course adjustments.

The UGV in some embodiments may emit a short acoustic pulse, or a specified acoustic pulse code string. The sensor, when detecting the specific acoustic pulse (e.g., discriminated by amplitude) or the acoustic pulse code string, may respond acoustically by activating an integral geophone response testing transducer, set at maximum drive level. The sensor may be internally programmed to emit either a single pulse, or a specific code string of pulses. Both the UGV and the sensor's emitted pulses or code strings may be emitted only once, or may be repeated for a specified number of emissions. By suitable internally programmed acoustic data processing, the UGV and/or the sensor may search for the code embedded in incoming acoustic signals, to occur either at any one time, or be continuously summing the incoming data samples at a specified rate. The sensor's response, after detecting the receipt of the UGV's specified search/call pulse or code string, may be programmed to begin emitting a specific acoustic pulse and/or acoustic call sequence, shortly after receiving and recognizing each call from the UGV.

The sensor retrieval apparatus may have a sensor extraction system mounted on the UGV. The sensor extraction system may have the capability to capture a sensor and separate it from unconsolidated ground material. The extraction system may be able to access sensors outside the UGV operating envelope, e.g., 1 meter and e.g., 1 meter somewhat below the surface of unconsolidated ground material. The extraction system may mechanically interface with the sensor for retrieval and may have an extractor in the form of a multiple-tined fork. The extractor may also be in the form of a bucket with a sieve (mesh or screen) bottom, coarse enough to allow sandy material to fall through but fine enough to hold the sensor. In some embodiments, the extractor may comprise spades (spade-shaped shovel elements) mounted in a circular arrangement that may be closed underneath the sensor for extraction. In some embodiments, the extractor may be in the form of closable a tree excavation spade. The extraction system may have lifting capability to move and sift through unconsolidated ground material, leaving exposed the sensor to be recovered. The extractor may then lift up and move back over the top of the UGV, allowing the sensor to slide into a retrieved sensor storage system.

The extraction system may comprise a vibrator to aid the extractor in moving through unconsolidated ground material, or may comprise a compressed air supply and nozzle to blow unconsolidated material off the sensor to aid in its retrieval.

The UGV may have an excavator, which may comprise one or more ground removing attachments, such as a scoop, trencher or blade for rapidly removing unconsolidated ground material overburden, to enable digging down to more deeply buried sensors quickly.

One such ground removing attachment may be a wide, light weight, low-pressure tire, or a track system, either of which may have molded elastomer or rubber-like traction lugs around the radius, to dig away at the unconsolidated ground material when rotating. The rotating tire/track can move loose unconsolidated material, such as sand and gravel, rapidly enough to cause the spewing or discharge of the material outward several meters away from the excavated area, thus digging down into the ground material, not creating a close by debris pile, and not causing damage to the sensor if it is contacted by the excavator in the process.

The excavator can be mounted on a (e.g., 2 meter long) articulated and movable arm and may be powered by any known drive mechanism. The drive mechanism may be, for example and without limitation, a direct drive motor, a belt, chain, or drive shaft, operated so as to cause the tire/track, at the end of the arm, to rotate at a selected speed. In some embodiments, the arm may be powered to move up and down, and laterally as needed, as the material is removed. In another embodiment the arm may be powered to raise as needed, then through its own weight allowed to settle in a controlled fall, e.g., with pneumatic cylinder control, to the ground. The system may monitor the reaction force created by the rotating wheel/track when lifting overburden that tends to push the UGV in the opposite direction. The system may continuously control the UGV's motion drive system to counter the reactive force and continually raise and release the exaction arm so to reduce, then increase, the digging forces and the reactive forces against the UGV, allowing the UGV's motion drive system to maintain control over its position while countering the digging forces. The system may have the capability to calculate the dimensions required to dig a hole to be excavated down to the sensor that will allow the UGV to drive into the hole as required, and determine a vehicle driving pattern required to excavate the desired hole shape for the UGV to drive into and lift the sensor to be recovered. The system will continuously evaluate the ground surface around and into the excavated hole, while monitoring the range and angle to the sensor, calculating the remaining overburden of material over the sensor. Ceasing excavation when the sensor is determined to be within grasp of the system's extraction system.

During excavation, the UGV may interrogate a sensor's internally measured tilt angle and/or other sensor metrics such as RSSI, geodetic position, geodetic satellite signal SNR, real-time acoustic signal values of the sensor's acoustic sensor(s), e.g., geophones, and remaining sensor node battery charge to adjust the excavation for more optimal retrieval. A change in the target sensor's tilt angle may indicate a near-miss excavation attempt. A change in the RSSI and/or geodetic satellite signal SNR values may indicate enough surface material has been removed to switch excavation methods. A change in the sensor's detected acoustic signal may indicate a near miss or direct contact of the sensor by the excavator. Some seismic sensors may transmit the location on their own external housing where such contact occurred further optimizing the extraction. Detection by the UGV of a sensor low battery signal may cause the UGV to cease operation of the sensor's RF system, e.g., by stopping the trigger signal, so as not to totally deplete the sensor's battery. Not depleting a sensor battery may leave sufficient battery power in the sensor node for subsequent geophysical and other data extraction from the sensor, if and necessary.

Once the target sensor is extracted, a device to move the sensor from the extractor system into a sensor storage system on the UGV may be operated. The UGV may have devices to prepare the extracted sensor for travel, which devices may have capability of orienting the sensor, communicating with the sensor to switch off data acquisition and recording, and storing the sensor securely. While stored during transport, the sensors' internal batteries may also be recharged and have stored data downloaded from data storage in the sensors. Data storage in the UGV equipment for sensor data storage may be designed to maximize the quantity of sensors that can be collected in one trip, while staying within the payload constraints of the UGV. The data storage equipment may record serial numbers or other sensor identifying information in a record of all sensors stored on the UGV for transport. The sensor storage system may be designed to allow for easy unloading of the sensors.

If it is determined that any specific sensor cannot be feasibly recovered through excavation and extraction, the retrieval system can send a command signal to the sensor to communicate the sensor's stored data for storage on the UGV equipment. The data communicated from the sensor may then be decoded, checked for quality and parity, and stored in, for example, a mass memory system in the UGV equipment. The precise spatial location of the sensor may be recorded for possible future retrieval, e.g., manually.

Having explained functionality of a system according to the present disclosure in general terms, example embodiments will be explained with reference to FIGS. 1 through 11, and methods for retrieving sensors according to the disclosure will be explained with reference to FIGS. 12 and 13. In the various views in FIGS. 1 through 11, like components have been given like reference numerals.

FIG. 1 shows an example embodiment of a sensor retrieval system 10 disposed on an unmanned ground vehicle (UGV) 11. The retrieval system 10 may comprise an excavator 12A disposed at one end of an excavator arm 12. The excavator, as explained previously, may be used to remove excess overburden for sensors that have become buried below a certain depth. The excavator 12A may be a rotating blade trencher, for example, rotated by a motor 12A1 such as an electric, pneumatic or hydraulic motor. The excavator 12A may be directly rotated by the motor 12A1 or may be rotationally coupled to the motor 12A1 by any suitable rotary connection, including, without limitation, gears, belts or chains. The excavator arm 12 may be moved, for example, about two or three axes of rotation by, for example, hydraulic ram/cylinder combinations 12B of types well known in the art, hydraulic or electric motors or other drive mechanism.

The retrieval system 10 may also comprise an extractor 14 that is used to remove sensors from the ground, either directly or after excavation if needed. The extractor 14 may be in the form of a front end loader scoop or bucket, or may be in the form of a tined fork 14A. In the example embodiment shown in FIG. 1, the tined fork 14A may be urged below the elevation of a sensor (30 in FIG. 3), and moved horizontally to dispose the sensor between two adjacent tines to lift the sensor from the ground and deposit the lifted sensor into a storage container or bin 16 on the retrieval system 10. The extractor 14 may be operated to rotate about two or three axes of rotation as the excavator arm 12. The storage bin 16 is provided for retrieved sensors to be disposed during transportation to any chosen recovery location.

The retrieval system 10 may have a propulsion system (not shown separately) comprising any means known in the art for moving a vehicle, including, without limitation, electric, hydraulic, pneumatic or fuel burning motor(s) coupled to suitable power transmission devices (not shown). The retrieval system 10 may have any suitable steering system known for use with such vehicles to direct vehicle motion along any chosen direction. Wheels and ground contact for the retrieval system 10 may comprise any types known for vehicle movement along varying and sometimes unconsolidated terrain, including, without limitation sand capable tires 15 and tractor treads (not shown).

Figure 2A:
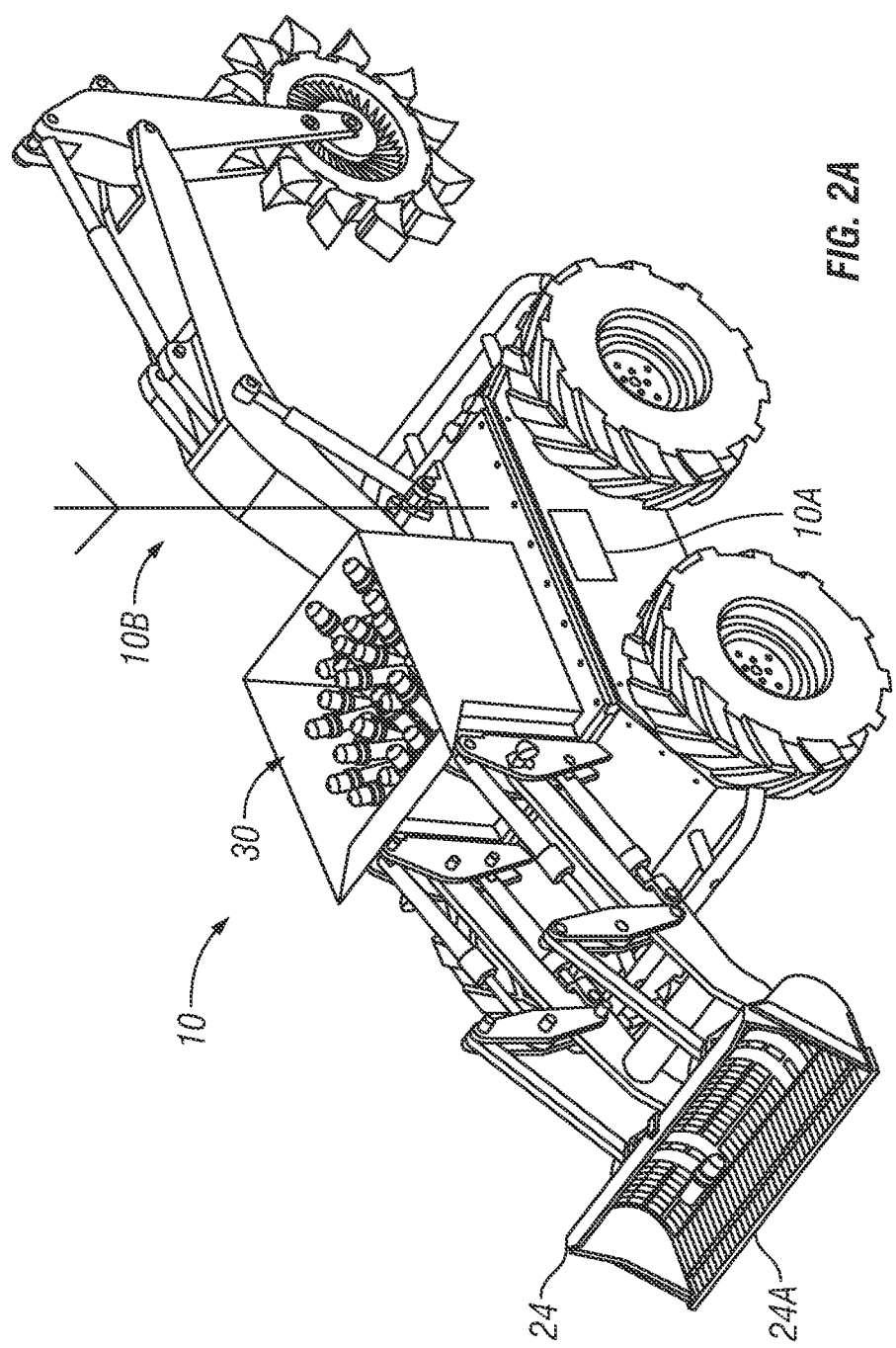
FIG. 2A shows another view of the example embodiment shown in FIG. 1.

FIG. 2A shows another example embodiment of the retrieval system 10, wherein the extractor 24 comprises a bucket shaped device similar to the scoop or blade on a front end loader. The extractor 24 may comprise a grid, screen or mesh 24A to facilitate removal of loose material from extracted sensors before moving the extracted sensors 30 to the storage bin 16. The retrieval system 10 may comprise an antenna array 10B in signal communication with a control system 10A in or on the retrieval system 10. The control system 10A may comprise one or more microcontrollers, microprocessors, floating programmable gate arrays, application specific integrated circuits, programmable logic controllers, drivers and combinations of the foregoing to detect and decode geodetic position (e.g., GNSS or GPS) signals, short and long range radio frequency (RF) signals and/or command signals from a remotely located user control (not shown). The control system 10A may also generate control signals to operate the propulsion system, the steering system the excavator 12A and the extractor 24 (or 14 in FIG. 1) as will be explained further below.

Figure 2B:
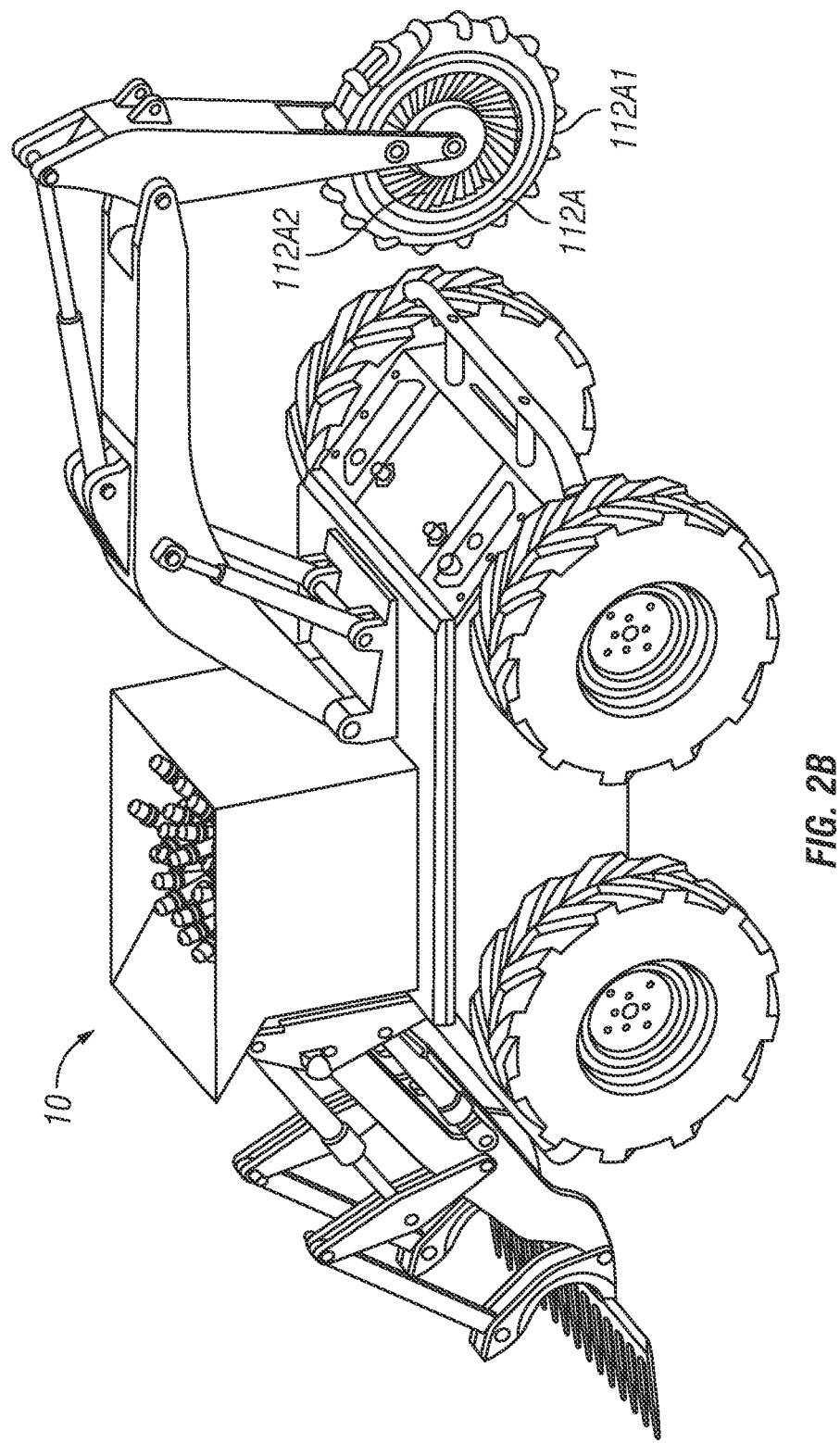

FIGS. 2B and 2C show another example embodiment of the retrieval system 10 having a different form of excavator 112A. The present embodiment of the excavator 112A is arranged to remove unconsolidated material while reducing risk of damage to sensors. The excavator 112A may be in the form of a wide, light weight, low-pressure tire 112B or a track system, with molded elastomer (e.g., rubber) traction lugs 112A1 disposed around the circumference of the excavator tire 112B, to displace the unconsolidated ground material when turning. The rotating tire/track 112B can move loose unconsolidated material, such as sand and gravel, rapidly enough to cause the spewing or discharge of the material outward several meters away from the excavated area, thus digging down into the ground material and not creating a close by debris pile. By using elastomer for the excavator 112A, damage to the sensor may be avoided if the sensor is contacted by the excavator 112A during operation.

Figure 3:
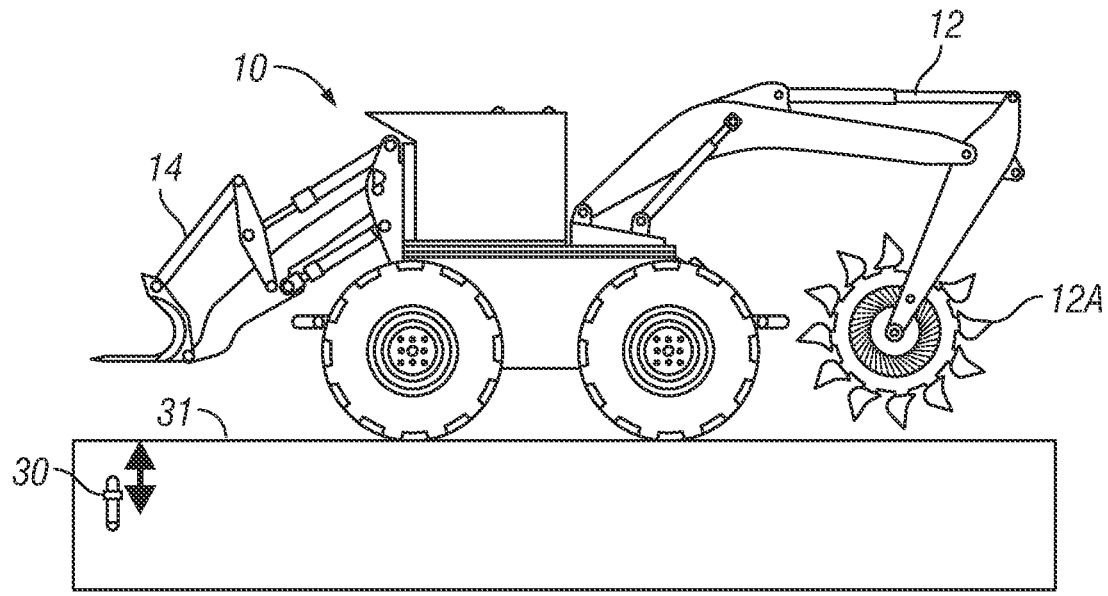
FIGS. 3 through 7 show using an extractor to remove a sensor from the ground.

Referring to FIGS. 3 through 7, in some types of sensor retrieval, a sensor 30 may be disposed below the ground surface 31 by a shallow overburden, e.g., one meter or less, such that the extractor 14 may be used to directly lift and retrieve sensor(s) 30 from below the ground surface 31. In FIG. 3, the retrieval system 10 may be moved in the direction of a known sensor location, or may navigate to such sensor location 30 (the sensor being shown at 40 in FIG. 7). A predetermined sensor location may be communicated to the control system (10A in FIG. 2A) by RF or other signal, or may be preprogramed into the control system (10A in FIG. 2A) at the time the retrieval system 10 is deployed to recover one or more sensors 30. The retrieval system 10 may also navigate to any one or more sensor locations using RF signals emitted by suitable devices in the sensor(s) 30 as explained above and with reference, for example to U.S. Pat. No. 10,054,700 issued to Degner et al. and to U.S. Patent Application Publication No. 2008/0137484 field by Scott. The control system (10A in FIG. 2A) may process the signals to determine distance, direction and angular elevation of each sensor 30 with reference to the retrieval system 10.

Figure 4:
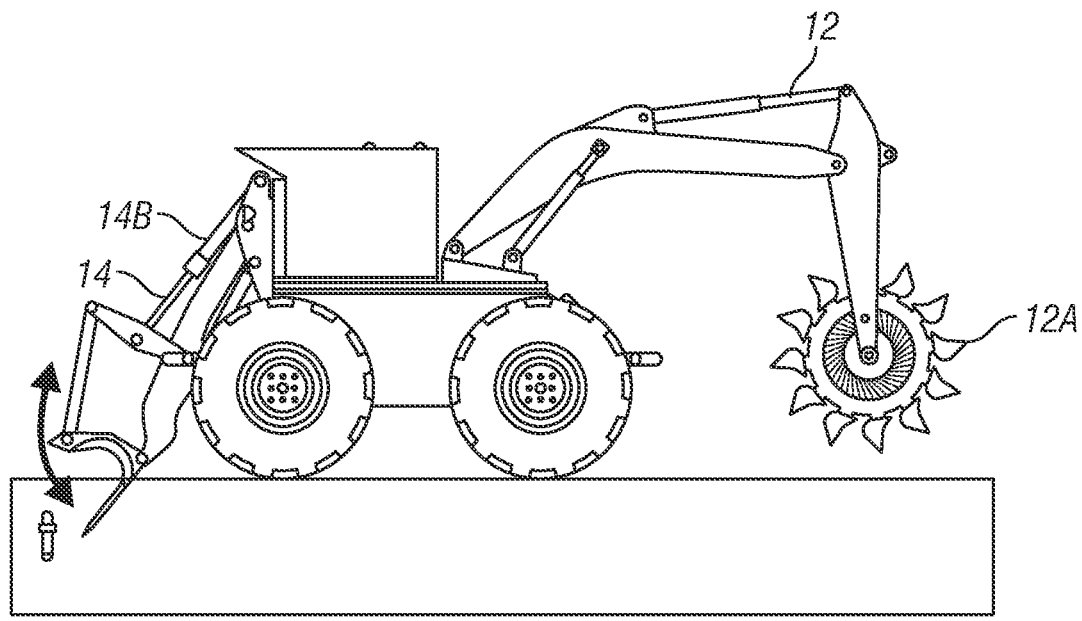
Figure 5:
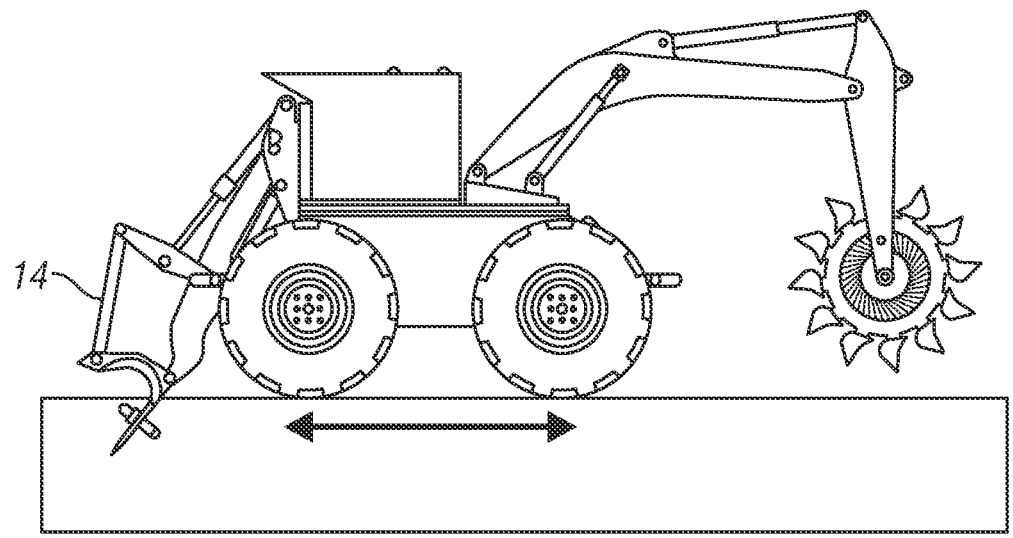

When the retrieval system 10 moves to within a predetermined distance of the position of the sensor, movement of the retrieval system 10 may be stopped and the extractor 14 may be operated to recover the sensor 30. In FIG. 4, the extractor 14 is lowered so that the tines (see FIG. 1) or scoop (see FIG. 2A) is disposed below the determined below-ground elevation of the sensor 30. If and as necessary, the extractor arm 14B may be moved laterally and/or the retrieval system 10 may be moved along the ground, see the arrows in FIG. 5)=, so that the extractor 14 is positioned to lift the sensor 30 when the extractor 14 is moved vertically.

Figure 6:
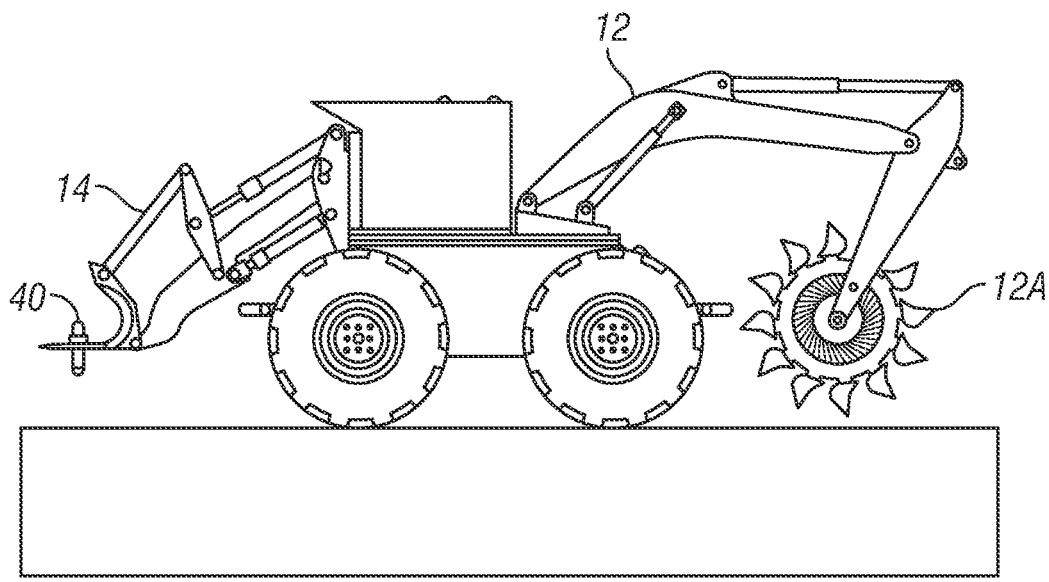
Figure 7:
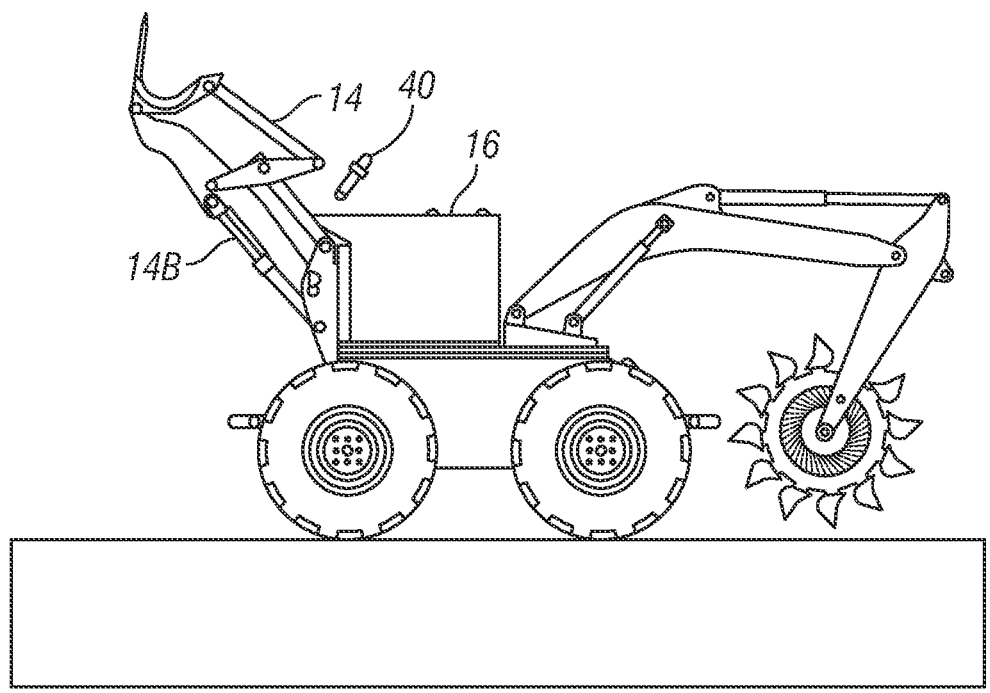

In FIG. 6, the sensor 30 is shown lifted out of the ground by the extractor 14. In FIG. 7, the extractor 14 is rotated by moving the extractor arm 14B toward the storage bin 16 to discharge the sensor 30 into the bin 16. The retrieval system 10 may then proceed toward another sensor location. Such movement of the retrieval system 10 may be performed, for example, by following a preprogramed extraction sequence, by navigation based on geodetic locations stored in the control system (10A in FIG. 2A), by signals from the sensor(s) 30 or any combination of the foregoing.

Figure 8:
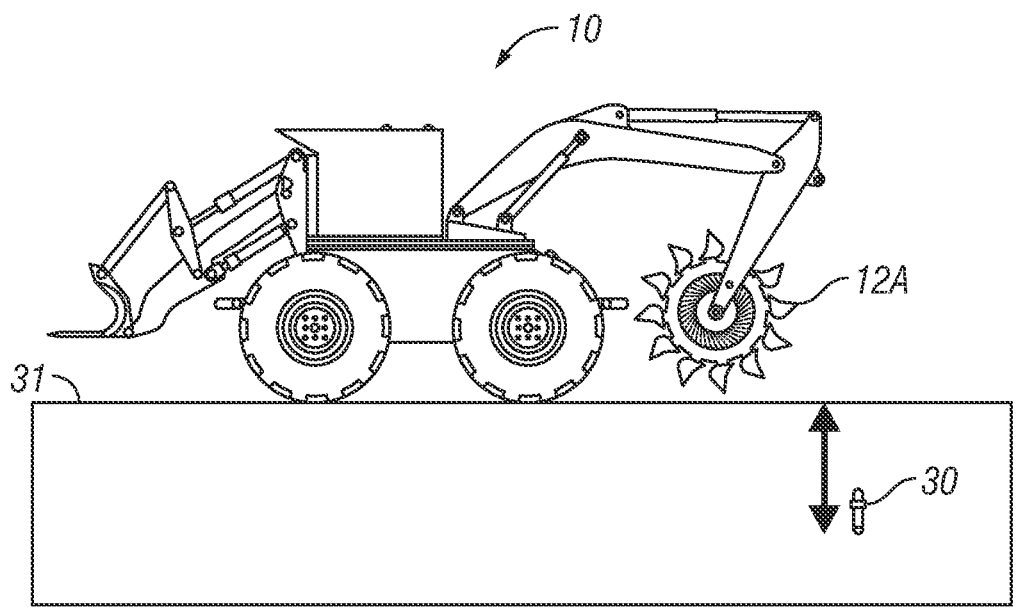
FIGS. 8 through 11 show using an excavator to remove excess overburden before using the extractor of FIGS. 3 through 7.
Figure 9:
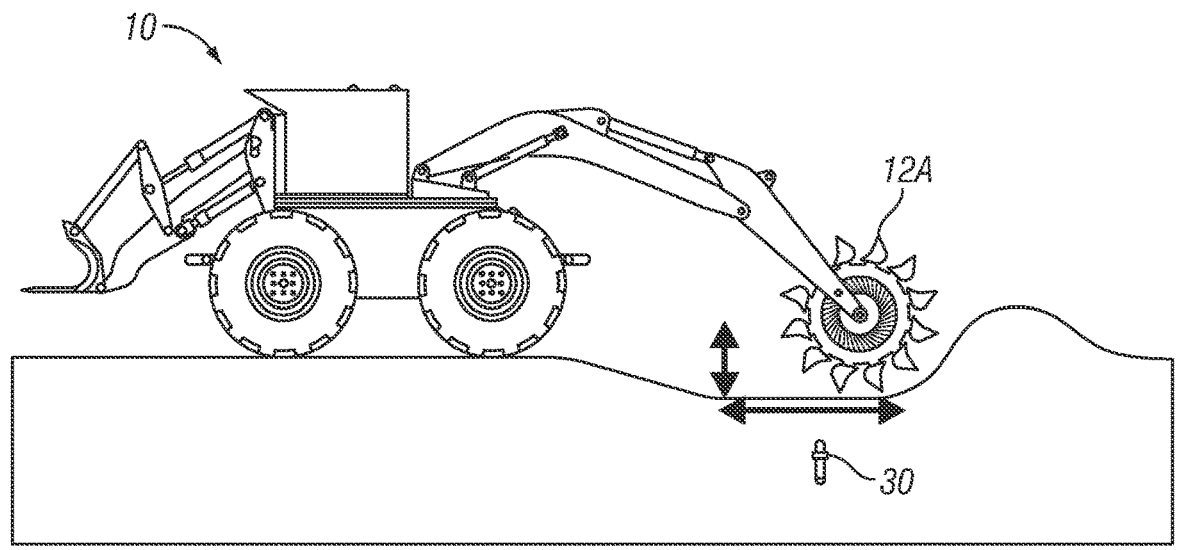
Figure 10:
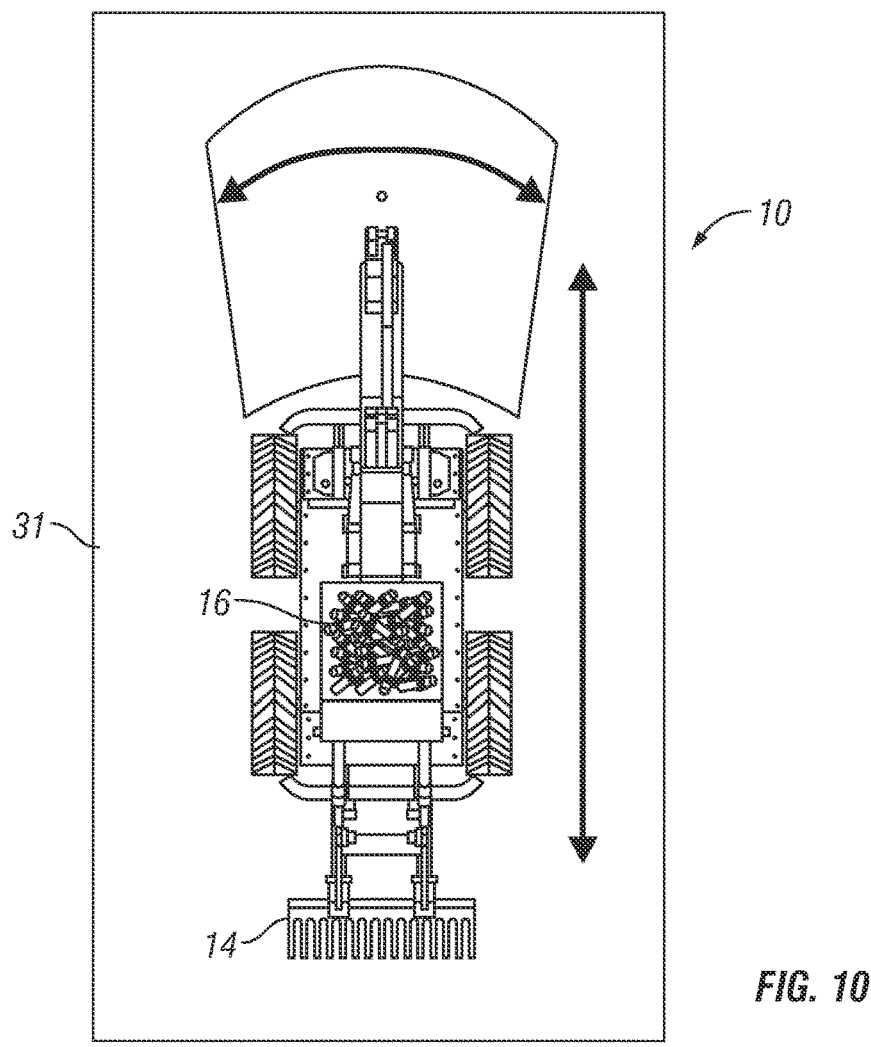

FIGS. 8 through 11 show using the retrieval system 10 to extract sensors that are disposed too deeply under the ground surface 31 for the extractor alone 14 to remove them safely and efficiently. In FIG. 8, a sensor (e.g., 40 in FIG. 7) may be determined to be buried below the ground surface 31 at a depth exceeding the safe operating depth of the extractor 14. Such determination may be made by precise location 30 of the sensor in space, and determining the geodetic elevation of the ground surface 31 at such location 30 and its immediate surroundings. The retrieval system 10 may be navigated to within a selected lateral distance of the sensor's horizontal coordinate position. Referring to FIG. 9, the retrieval system 10 may be positioned such that the excavator 12A is disposed approximately vertically over the position 30 of the sensor. The excavator 12A may then be operated to remove some of the material covering the sensor. In the present example embodiment, the excavator 12A may be operated to remove material to within a predetermined elevation of the elevation of the sensor. Thus, as shown in FIG. 9, some material may remain on top of the sensor after operation of the excavator 12A is completed. In FIG. 10, the retrieval system 10 may be moved in two directions along the ground surface, such as by operating the propulsion system to effectively rotate and/or translate the retrieval system 10 along the ground surface 31. Such rotation may increase the area from which the excavator 12A removes material from above the sensor. Such removal may facilitate subsequent operation of the extractor 14.

Figure 11:
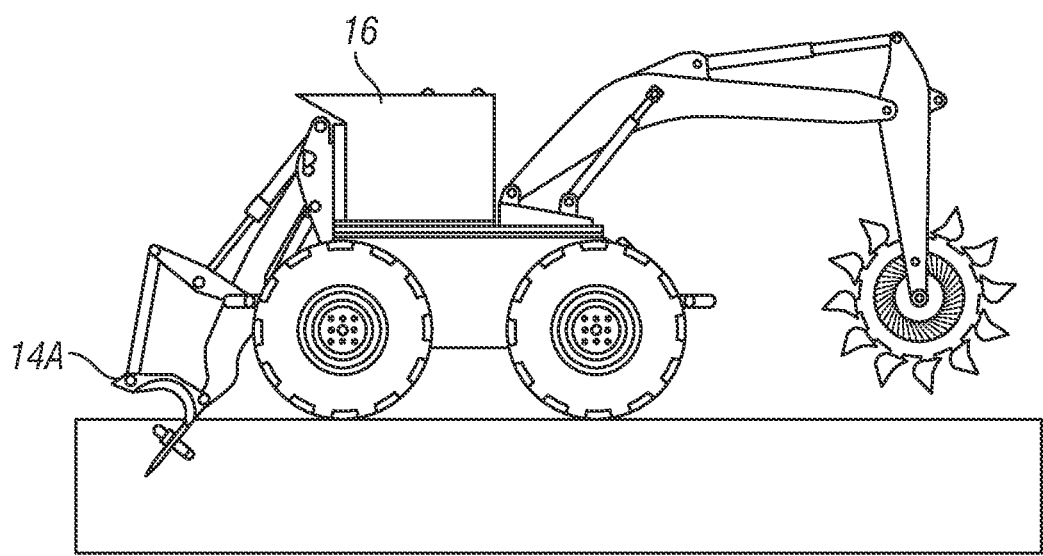

As shown in FIG. 11, the retrieval system 10 may be moved so that the extractor 14 is disposed approximately above the excavated sensor 30. The extractor blade or tines 14A may then be operated in a similar manner as explained with reference to FIGS. 4 through 7 to extract the sensor and deposit it in the storage bin 16.

The foregoing extraction, and where needed excavation, may be repeated for any further sensors desired to be extracted and transported to a chosen location.

Figure 12:
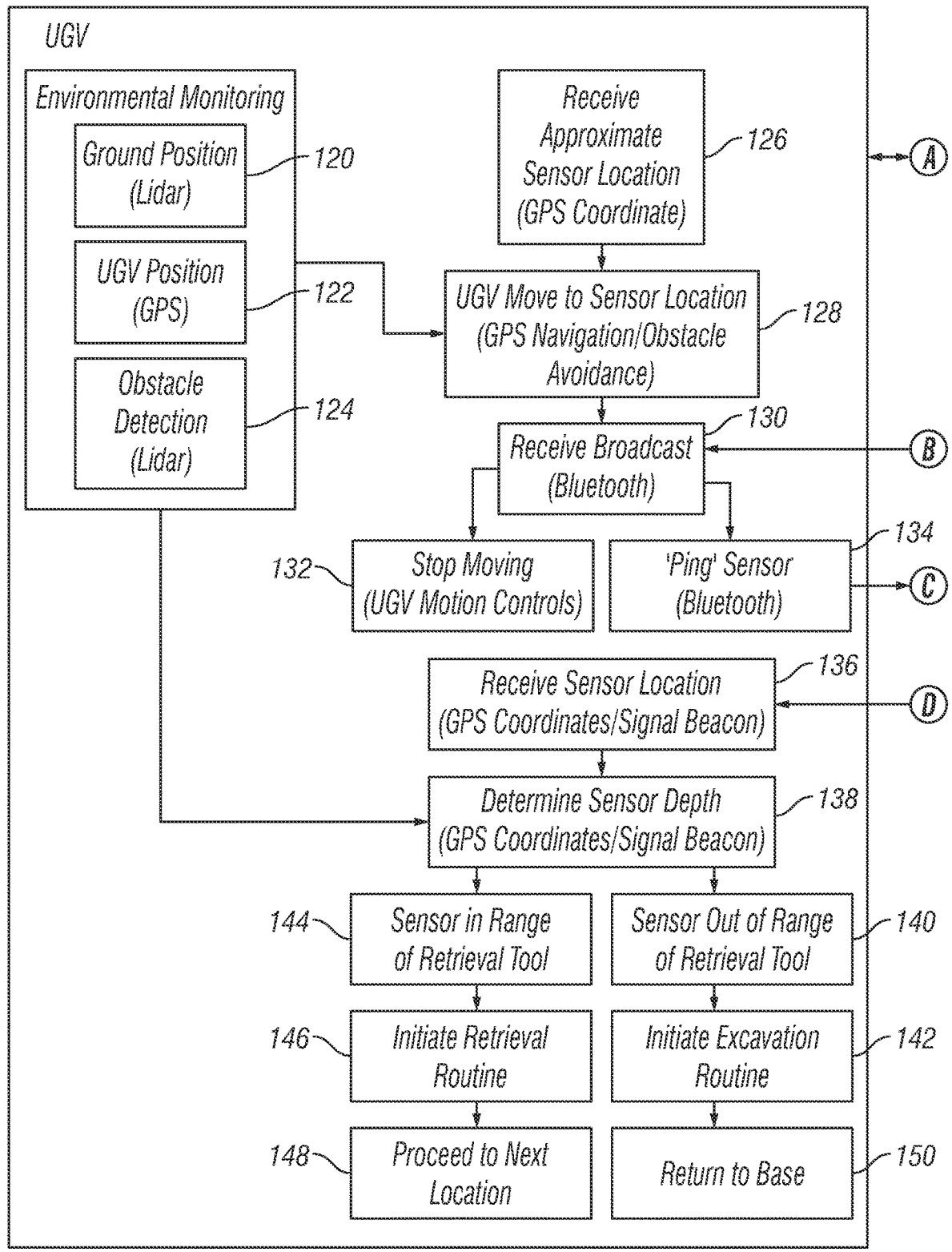
FIG. 12 shows a functional diagram of a system according to the present disclosure.
Figure 12:
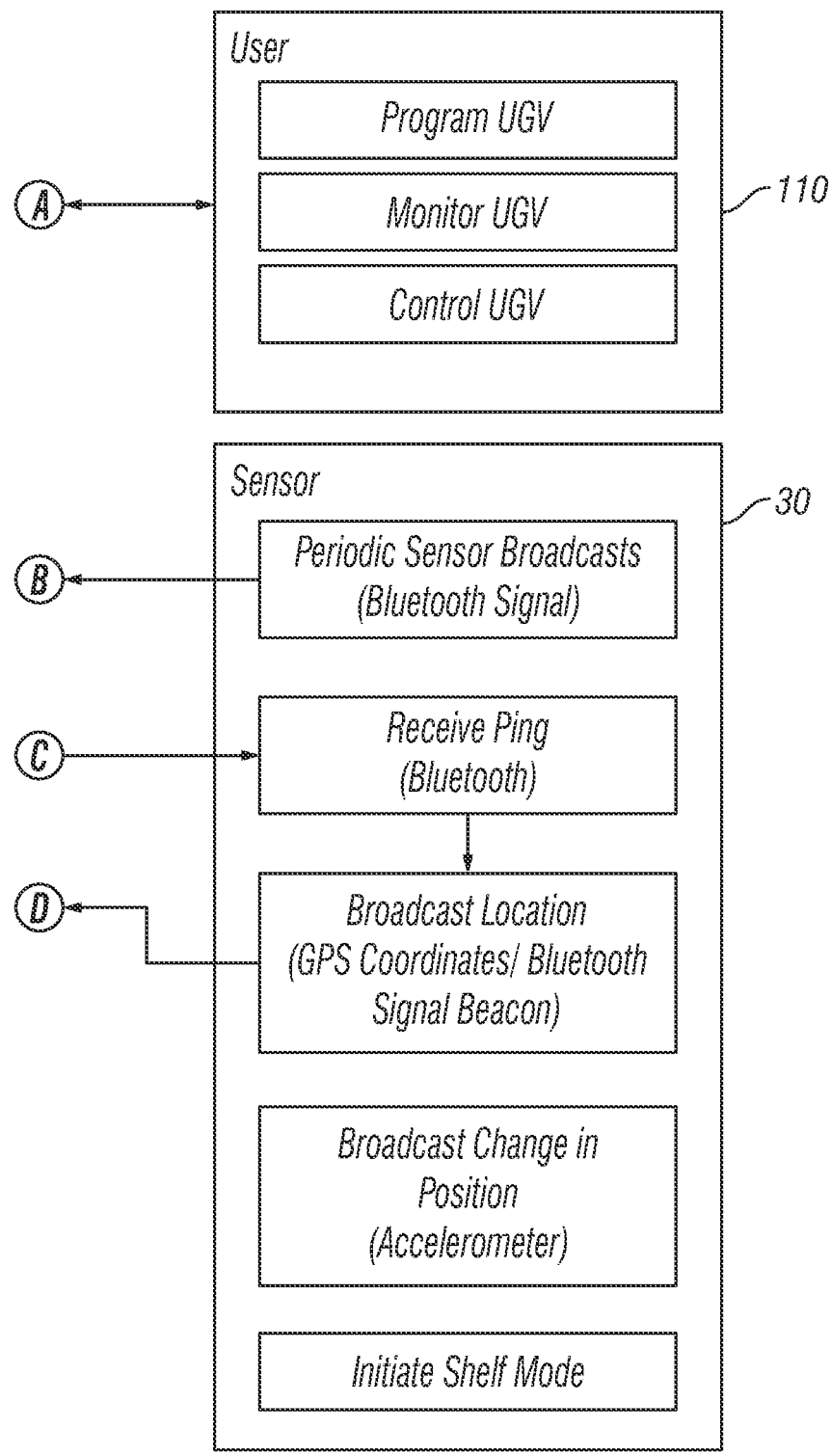

Referring to FIG. 12, example functions performed by the various components of the retrieval system and sensors will be explained. At 120, 122, and 124, respectively, the ground position, determined, e.g., by LIDAR, the retrieval system position, determined, e.g., by geodetic position signal detection, and position of ground obstacles, determined, e.g., by LIDAR, may be detected and communicated to the control system (10A in FIG. 2A). At 126, sensor position(s) may be communicated to the control system 10A such as by RF communication channel, or the sensor positions may be preprogramed into the control system (10A in FIG. 2A). At 128, the retrieval system is navigated toward a first sensor location, wherein the ground, retrieval system and obstacle positions are used to correct navigation as needed. At 130, an RF signal, e.g., a BLUETOOTH signal, may be detected after the control system (10A in FIG. 2A) emits an interrogation signal. BLUETOOTH is a registered trademark of Bluetooth Special Interest Group, 5209 Lake Washington Boulevard NE Suite 350 Kirkland Wash. 98033. In such event, the geodetic position of the sensor (40 in FIG. 7) may be communicated to the control system (10A in FIG. 2A). At 138, the sensor depth may be determined using RF signal detection and angle determination. At 140, if the sensor depth is greater than the extractor depth range, the retrieval operation may commence at 142 as explained with reference to FIGS. 8 through 11. If, at 144, the sensor depth is within the extractor depth range, or after excavation at 142, extraction can commence at 146 as explained with reference to FIGS. 3 through 6. At 148, if additional sensors require extraction, the retrieval system may be operated to move to a subsequent sensor location. If the last sensor has been extracted, at 150, the retrieval system may navigate back to a chosen location.

FIG. 13 is a flow chart showing an example embodiment of operation of the extractor as in FIGS. 3 through 6. At 160, 162, and 164, position (30 in FIG. 4) of the retrieval system and the sensor in space are used to navigate the retrieval system 10 to the position (30 in FIG. 4) of the sensor. At 166, the retrieval system is positioned so that the extractor (14 in FIG. 1) is disposed above the sensor (40 in FIG. 7). At 168, the extractor (14 in FIG. 1) is positioned so that it can be moved below the sensor for extraction. At 170, any further required movement of the retrieval system 10 is performed for extraction (see FIGS. 4 and 5). At 172, the extractor is operated to lift the sensor. At 174, sensor extraction may be confirmed, e.g., by interrogating geodetic position signal data from the sensor to determine if it is coincident with the extractor position and elevation. At 176, the lifted sensor may be disposed in the storage bin (16 in FIG. 1). At 178, further operation, such as battery charging or storage interrogation may be performed on the retrieved sensor, or on some or all of the retrieved sensors disposed in the storage bin.

FIG. 14 shows additional operations performed when it is necessary to operate the excavator. At 180, 182, 184 and 186, respective positions and sensor depths are determined and conducted to the control system (10A in FIG. 2A). At 188, ground elevation and consequent sensor depth are used by the control system 10A to determine an excavation depth needed. At 192, excavation accessibility is determined. At 194, an excavator trajectory (plan) is generated by the control system. At 196, the retrieval system is moved to locate the excavator 12A over the sensor position and ground material is removed to the trajectory depth. At 198, excavated ground elevation with reference to sensor geodetic elevation are compared to determine if the excavated ground absolute (geodetic) elevation is low enough to put the sensor within the depth range of the extractor. Excavation may be repeated if the sensor depth is below the depth range of the extractor, otherwise the process in FIG. 12 to operate the extractor may begin for the specific sensor.

Figure 15:
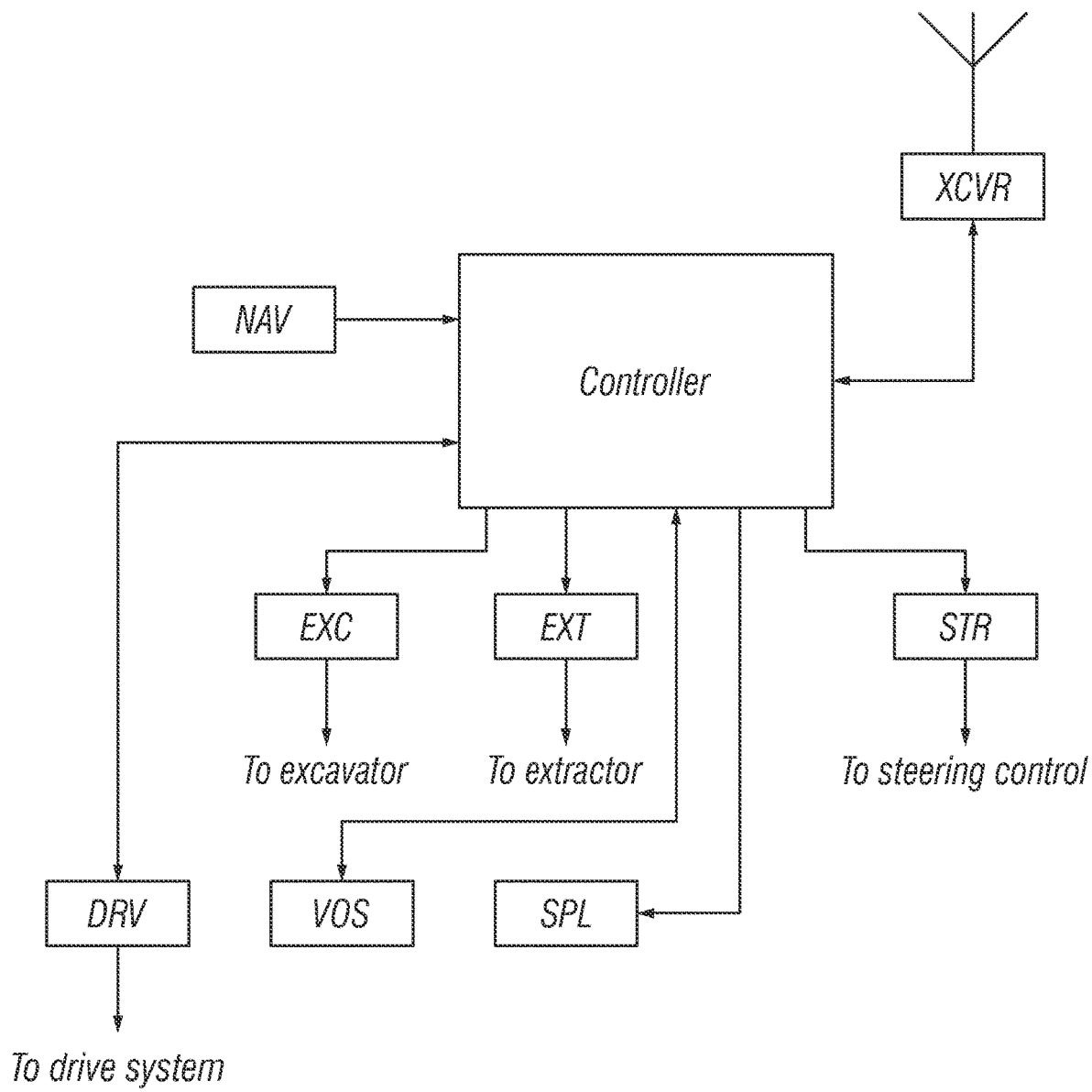
FIG. 15 is a functional block diagram of an example embodiment of a control system.

An example embodiment of the control system 10A is shown in a functional block diagram in FIG. 15. The control system 10 may comprise any form of system controller as explained with reference to FIG. 2A, and is shown generally at 200. The system controller 200 may accept as input signals from a navigation controller 202, which may be a separate physical component, or may be integral with the controller 200. The navigation controller 202 may have stored thereon a preprogrammed geodetic path for the retrieval system, or may generate navigation control signals in response to determined geodetic position of the retrieval system with reference to known and/or detected positions of the sensors to be retrieved.

A transceiver 214 may be in signal communication with the antenna 10B to detect geodetic position signals, location and other signals from the sensors and as needed to communicate command signals to the sensors and/or a remote control station (not shown). The system controller 200 may generate, as needed at any time, suitable control signals to operate a vehicle drive controller 212, which causes UGV motion in either forward or backward direction and at a selected speed. The drive controller 212 may operate one or more drive motors (not shown separately) in the UGV to cause such motion. The system controller 200 may generate as needed at any time, suitable control signals to operate a steering controller 208. The steering controller 212 may operate a steering mechanism to change direction of motion of the UGV. The steering mechanism (not shown) may be a separate device to change orientation of the plane of rotation of one or more of the drive tires/tracks (see 15 in FIG. 1) an/or may selectively change rotation speed and direction of any one or more such tires or tracks to change direction of motion of the UGV.

A sensor position locator 210 may detect signals and/or aspects of the one or more sensors to enable determining respective spatial positions in the ground. The sensor position locator is in signal communication with the system controller 200 to enable determination of how to move the UGV and how to operate the excavator and extractor to extract and retrieve the one or more sensors. As previously explained, depending on the determined depth of the sensor, and from orientation of the UGV, which may be facilitated by a vehicle orientation sensor 216, the system controller 200 may send suitable control signals to operate the extractor (through extractor controller 206) and/or the excavator as may be needed (through excavator controller 204.

Operation of the components shown in FIG. 15 may be performed as explained with reference to FIGS. 12, 13 and 14.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments may be combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A sensor retrieval system, comprising:
a self-propelled unmanned ground vehicle (UGV) having thereon a control system including a navigation controller, an excavator controller and an extractor controller, the navigation controller having thereon instructions to move the UGV to proximate a geodetic position of a sensor disposed proximate a surface of the ground;
the UGV further comprising a sensor position locator arranged to determine distance, direction and relative elevation of the sensor with respect to the UGV, the sensor position locator comprising a receiver for detecting radio frequency location signals emitted by the sensor and means for determining depth of the sensor from the detected location signals;
an extractor in signal communication with the extractor controller, the extractor comprising means for lifting the sensor from the ground when the sensor is buried to at most a predetermined depth;
an excavator in signal communication with the excavator controller, the excavator comprising means for removing overburden from above the sensor to leave the overburden to at most the predetermined depth when the sensor is buried below the predetermined depth, the excavator comprising a wheel having excavation projections thereon, the excavation projections made from elastomer;
wherein the navigation controller has instructions thereon to position the UGV such that the extractor is disposed above the sensor when the relative elevation is at most the predetermined depth;
wherein the navigation controller has instructions thereon to position the UGV such that the excavator is disposed above the sensor when the relative elevation is above the predetermined depth; and
wherein the navigation controller, the extractor controller and the excavator controller having instructions thereon to position the UGV, operate the extractor and operate the excavator to remove excess overburden and extract the sensor based on the relative elevation.

2. The system of claim 1 wherein the navigation controller, the excavator controller and the extractor controller comprise at least one of a microcontroller, a microprocessor, a floating programmable gate array and an application specific integrated circuit.

3. The system of claim 1 wherein the navigation controller, the excavator controller and the extractor controller form part of a system controller.

4. The system of claim 1 further comprising a geodetic position signal receiver in signal communication with the navigation controller.

5. The system of claim 1 wherein the navigation controller comprises a radio frequency transmitter arranged to emit a trigger signal detectable by the sensor to initiate transmission of the radio frequency location signal.

6. The system of claim 1 wherein the extractor comprises a tined fork.

7. The system of claim 6 further comprising a vibrator operable to vibrate the extractor so as to enhance separating ground cover from the sensor.

8. The system of claim 1 wherein the extractor comprises a bucket having a screen or mesh therein for separating ground cover from the sensor.

9. The system of claim 8 further comprising a vibrator operable to vibrate the extractor so as to enhance separating the ground cover from the sensor.

10. The system of claim 1 further comprising a storage bin disposed on the UGV, wherein the extractor is operable to discharge extracted sensors into the storage bin.

11. A method for retrieving sensors disposed proximate a ground surface, comprising:
   a) automatically moving a vehicle comprising an excavator and an extractor to a position proximate a sensor disposed proximate a ground surface, the excavator comprising a wheel having elastomer excavation projections thereon;
   b) determining a depth of the sensor below the ground surface, a depth of the sensor determined by detecting location signals emitted by the sensor;
   c) automatically positioning the extractor over the position when the sensor depth is at most equal to a predetermined depth or automatically positioning the extractor over the position if the sensor depth is greater than the predetermined depth;
   d) operating the excavator by rotating the wheel to remove surface cover to reduce the sensor depth to at most the predetermined depth when the extractor is positioned over the position;
   e) operating the extractor to remove the sensor when the sensor depth is at most equal to the predetermined depth;
   f) depositing the sensor in a storage bin on the vehicle; and
   g) automatically moving the vehicle to either a location of another sensor and repeating (b) through (f) for the another sensor, or automatically moving the vehicle to a predetermined other location.

12. The method of claim 11 wherein the automatically moving the vehicle to the position proximate the sensor comprises determining a geodetic position of the vehicle and comparing the geodetic position to a predetermined geodetic position of the sensor.

13. The method of claim 11 wherein the automatically moving the vehicle to the position proximate the sensor comprises detecting a radio frequency signal transmitted by the sensor.

14. The method of claim 11 wherein the automatically moving the vehicle to the position proximate the sensor comprises emitting at least one of a radio frequency signal and an acoustic signal from the vehicle and detecting at least one of a radio frequency signal and an acoustic signal emitted in response by the sensor.

15. The method of claim 14 wherein the acoustic signal emitted by the vehicle comprises an encoded pulse string.

16. The method of claim 14 wherein the acoustic signal emitted by the sensor comprises an encoded pulse string.

17. The method of claim 11 further comprising interrogating a data storage device in the sensor by communicating between the sensor and a controller in the vehicle.

* * * * *